United States Patent
Saruwatari et al.

(10) Patent No.: US 6,895,912 B2
(45) Date of Patent: May 24, 2005

(54) VARIABLE VALVE CONTROL APPARATUS FOR ENGINE AND METHOD THEREOF

(75) Inventors: Masayuki Saruwatari, Atsugi (JP); Junichi Furuya, Atsugi (JP); Toru Kitayama, Atsugi (JP)

(73) Assignee: Hitachi, Ltd., Tokyo-to (JP)

( * ) Notice: Subject to any disclaimer, the term of this patent is extended or adjusted under 35 U.S.C. 154(b) by 0 days.

(21) Appl. No.: 10/420,879

(22) Filed: Apr. 23, 2003

(65) Prior Publication Data

US 2003/0200945 A1 Oct. 30, 2003

(30) Foreign Application Priority Data

Apr. 25, 2002 (JP) ......................................... 2002-123432

(51) Int. Cl.$^7$ ................................................. F01L 1/34
(52) U.S. Cl. ................................. 123/90.15; 123/90.16; 123/90.17; 123/308; 123/432; 123/568.11; 123/568.14
(58) Field of Search .......................... 123/90.15–90.18, 123/90.27, 90.31, 295, 301, 302, 306, 308, 429, 430, 432, 568.11, 568.13, 568.14; 251/129.08–191.1, 129.15–129.22

(56) References Cited

U.S. PATENT DOCUMENTS

| 4,651,684 | A | * | 3/1987 | Masuda et al. | .......... 123/90.16 |
| 4,875,455 | A | * | 10/1989 | Hashimoto et al. | ......... 123/315 |
| 4,964,375 | A | * | 10/1990 | Takeyama et al. | .......... 123/315 |
| 5,239,960 | A | * | 8/1993 | Sasaki et al. | ................ 123/308 |
| 5,269,270 | A | * | 12/1993 | Suzuki et al. | ................ 123/310 |
| 5,870,993 | A | * | 2/1999 | Stellet et al. | ................ 123/308 |
| 6,553,959 | B2 | * | 4/2003 | Xu et al. | ..................... 123/295 |
| 6,598,570 | B2 | * | 7/2003 | Nakamura et al. | ........ 123/90.15 |
| 6,615,795 | B2 | * | 9/2003 | Martin et al. | ................ 123/308 |
| 6,708,680 | B2 | * | 3/2004 | Lavy et al. | .................. 123/586 |

FOREIGN PATENT DOCUMENTS

JP     06-212928 A    8/1994

* cited by examiner

Primary Examiner—Thomas Denion
Assistant Examiner—Kyle M. Riddle
(74) Attorney, Agent, or Firm—Foley & Lardner LLP

(57) ABSTRACT

In a low rotation region of an engine, valve timing of two intake valves is advanced and also one of two exhaust valves is driven by means of a cam with valve lift lower than that of the other exhaust valve, to thereby set a valve overlap period within which only one of the two exhaust valves is opened.

44 Claims, 14 Drawing Sheets

VARIABLE VALVE CONTROL APPARATUS FOR ENGINE AND METHOD THEREOF

FIELD OF THE INVENTION

The present invention relates to a variable valve control apparatus for an engine and a method thereof, in particular, to a technique for adjusting a cylinder residual gas amount by controlling valve overlap.

RELATED ART OF THE INVENTION

Heretofore, there has been known a variable valve timing apparatus for controlling a cylinder residual gas amount by controlling a valve overlap amount (refer to Japanese Unexamined Patent Publication No. 6-212928).

If the valve overlap amount is increased, the cylinder residual gas amount is also increased so as to achieve the improvement of fuel consumption or exhaust emission.

However, there has been a problem in that, if the valve overlap amount is increased, gas flow is decreased to degrade the combustibility.

For example, in a four-valve engine provided with two exhaust valves and two intake valves for each cylinder, if all of the valves are opened during a valve overlap period, an exhaust gas flowing back via the exhaust valves collides with fresh air sucked via the intake valves with kinetic energy equivalent to that of the fresh air, to disturb the gas flow in the cylinder.

As a result, an air-fuel mixture cannot be formed favorably to degrade the combustibility.

SUMMARY OF THE INVENTION

Therefore, the present invention has an object of enabling to enhance gas flow during a valve overlap period, to thereby increase a cylinder residual gas amount without degrading the combustibility, in a four-valve engine.

In order to achieve the above object, according to the present invention, there is set a valve overlap period within which only one of two exhaust valves is opened when an engine operating condition is a specific operating condition.

The other objects and features of the invention will become understood from the following description with reference to the accompanying drawings.

DESCRIPTION OF THE PREFERRED EMBODIMENT

Figure 1:
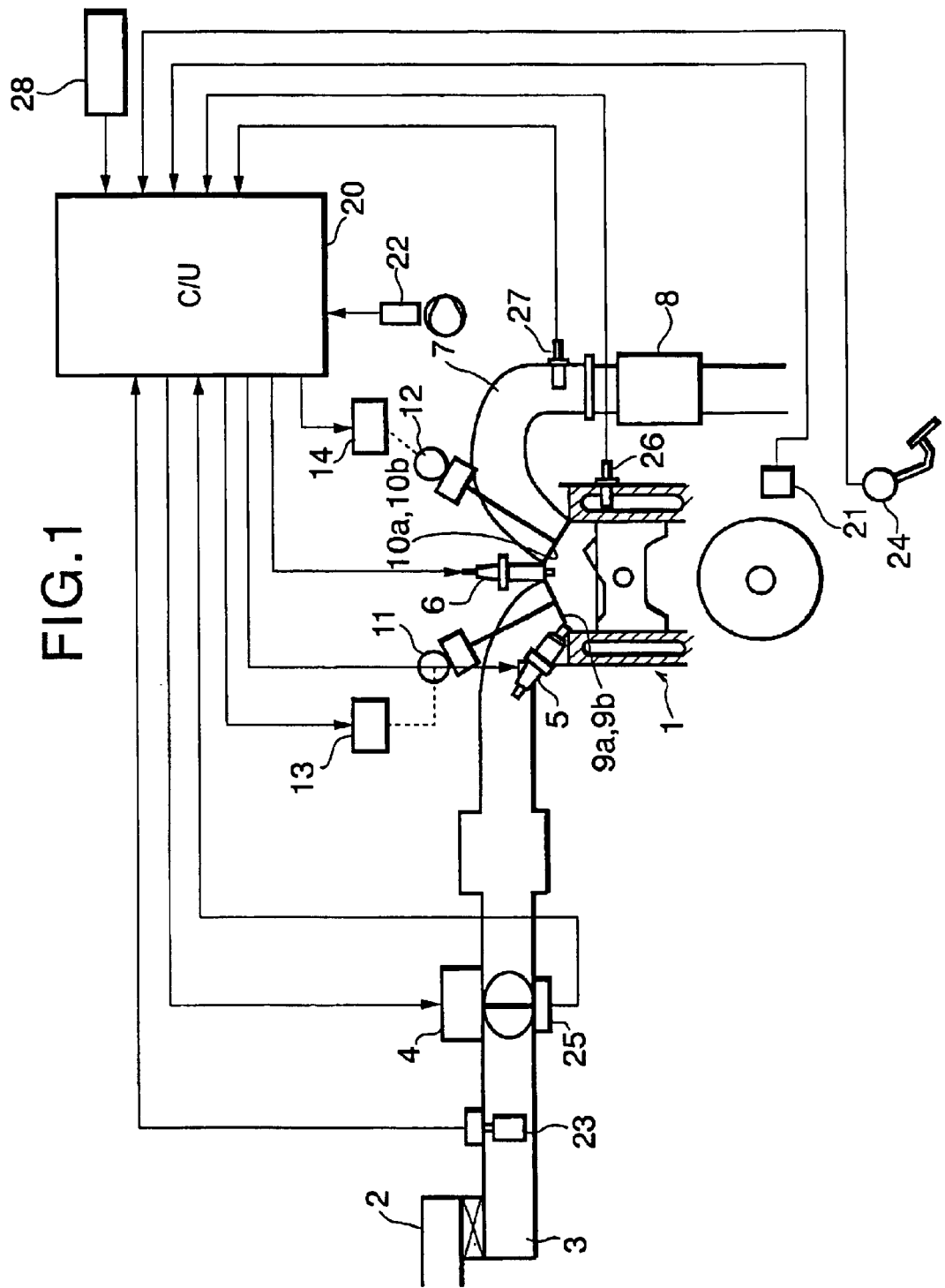
FIG. 1 is a diagram of a system structure of an engine.

FIG. 1 shows a system structure of an engine in embodiments.

In FIG. 1, air is drawn into a combustion chamber of each cylinder in an engine 1 via an air cleaner 2, an intake passage 3, and an electronic controlled throttle valve 4.

There is disposed an electromagnetic type fuel injection valve 5 for directly injecting fuel (gasoline) into the combustion chamber of each cylinder. Air-fuel mixture is formed in the combustion chamber by the fuel injected from fuel injection valve 5.

Fuel injection valve 5 is opened with power supply to a solenoid thereof by an injection pulse signal output from a control unit 20, to inject fuel adjusted at a predetermined pressure.

The air-fuel mixture formed in the combustion chamber is ignited to burn by an ignition plug 6.

Note, engine 1 may also be an engine in which fuel is injected into an intake port.

Exhaust gas from engine 1 is discharged from an exhaust passage 7.

A catalytic converter 8 is disposed in exhaust passage 7.

Catalytic converter 8 is a three-way catalytic converter, which oxidizes carbon monoxide CO and hydrocarbon HC in the exhaust gas, and reduces nitrogen oxide NOx, to convert them into harmless carbon dioxide, water vapor and nitrogen, respectively.

Figure 2:
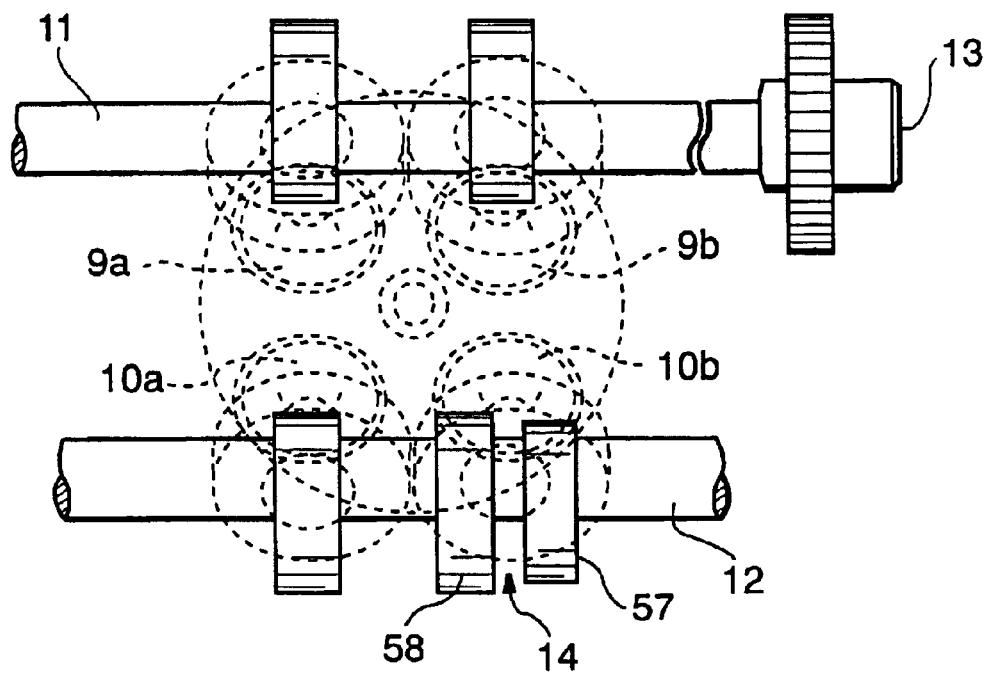
FIG. 2 is a top plan view showing intake/exhaust valves and a valve train.

Engine 1 comprises two intake valves 9a and 9b, and two exhaust valves 10a and 10b for each cylinder, as shown in FIG. 2.

Intake valves 9a and 9b are driven to open/close by a cam disposed on an intake side camshaft 11.

Exhaust valves 10a and 10b are driven to open/close by a cam disposed on an exhaust side camshaft 12.

A variable valve timing mechanism 13 is disposed to intake side camshaft 11.

Variable valve timing mechanism 13 is to change valve timing of intake valves 9a and 9b, by changing a phase of intake side camshaft 11 relative to a crankshaft.

Figure 3:
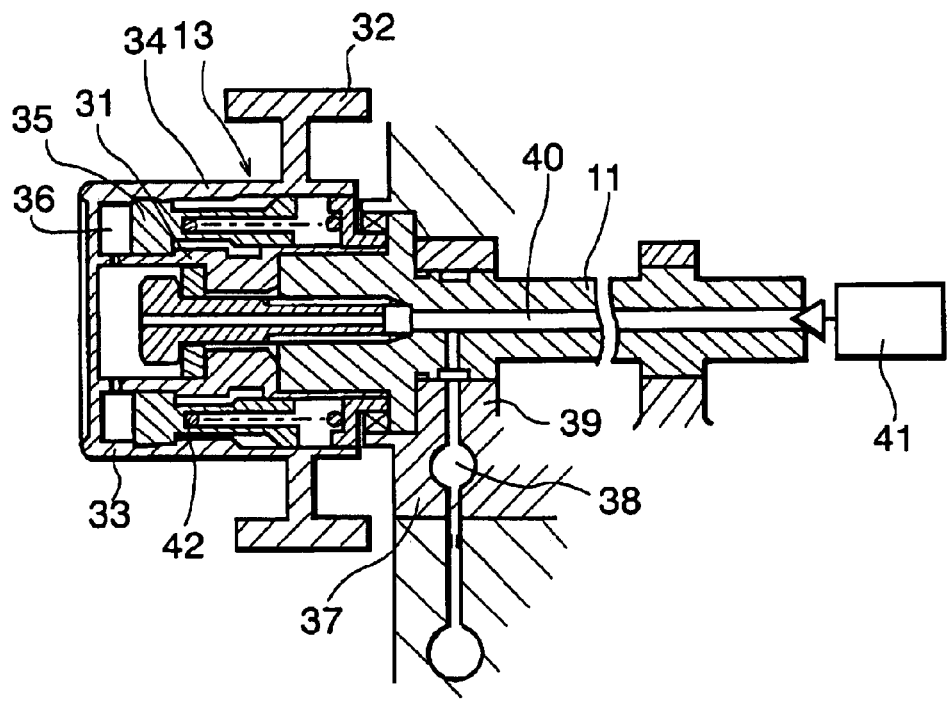
FIG. 3 is a cross section view showing a variable valve timing mechanism.

The configuration of variable valve timing mechanism 13 will be described in detail based on FIG. 3.

Variable valve timing mechanism 13 comprises an inner gear 31 fixed to camshaft 11, an outer gear 34 formed on a housing 33 that is integrated with a cam pulley 32 to which a rotation of the crankshaft is transferred, and an intermediate gear 35 engaging with gears 31 and 34.

Then, if intermediate gear 35 is displaced in an axial direction, camshaft 11 is rotated relatively to cam pulley 32, to vary valve timing of intake valves 9a and 9b.

To an oil chamber 36 formed on one side of intermediate gear 35, a pressurized oil from an oil gallery 38 of a cylinder head 37 and the like is introduced from a bearing portion 39 of camshaft 11 via an oil passage 40 within camshaft 11.

Further, an electromagnetic valve 41 for opening/closing a relief port of an oil passage 40 is disposed to the other end of camshaft 11.

If electromagnetic valve 41 is closed (the power supply ON), the pressurized oil from oil gallery 38 acts on intermediate gear 35 so that intermediate gear 35 is displaced to the right direction in the figure against a return spring 42, and thus valve timing is varied to advance.

On the other hand, if electromagnetic valve 41 is opened (the power supply OFF), the pressurized oil is released so that intermediate gear 35 is returned by return spring 42 to an initial position (most retarded position) as shown in the figure.

Note, variable valve timing mechanism 13 is not limited to the above configuration, and it is possible to use all of the known variable valve timing mechanisms, such as a vane type mechanism, a mechanism using an electromagnetic brake and the like.

Furthermore, there is provided a variable valve mechanism 14 that switches a cam for opening/closing exhaust valve 10b.

Figure 4:
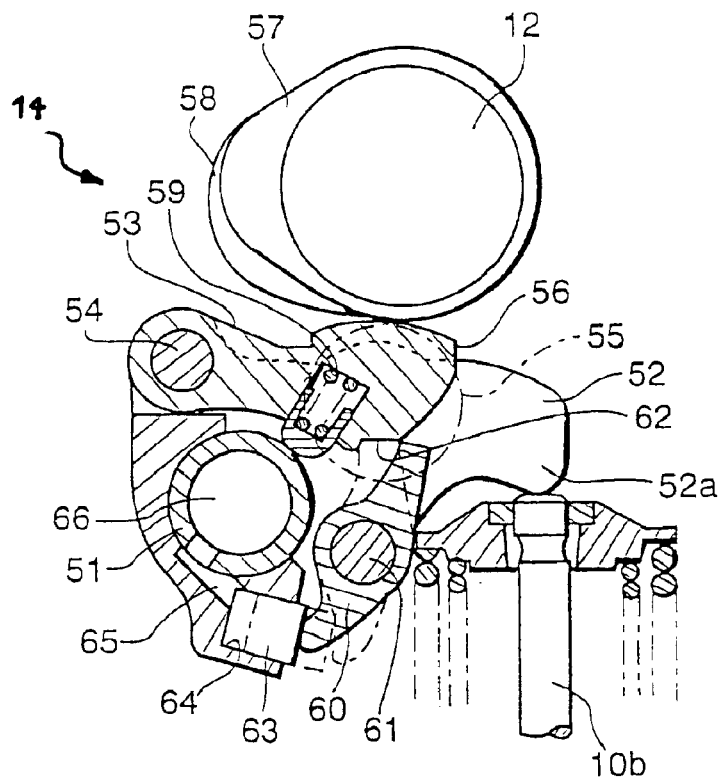
FIG. 4 is a cross section view showing a variable valve mechanism.

FIG. 4 shows variable valve mechanism 14.

In FIG. 4, a main rocker arm 52 is supported to be able to swing at one end portion thereof by a rocker shaft 51, and a subsidiary rocker arm 53 is disposed to rocker shaft 51 adjacently to main rocker arm 52.

Subsidiary rocker arm 53 is supported to be able to swing by a subsidiary rocker shaft 54 disposed to main rocker arm 52.

Main rocker arm 52 includes on an upper face thereof a cam follower roller 55, and a swinging end 52a thereof presses a stem end of exhaust valve 10b.

Note, subsidiary rocker arm 53 is formed shorter than main rocker arm 52, and is disposed with a cam follower portion 56 on an upper face of a tip end portion thereof.

On exhaust side camshaft 12 disposed above rocker shaft 51, a low lift cam 57 and a high lift cam 58 are formed adjacently with each other.

Low lift cam 57 is a cam with a small valve lift amount, for contacting cam follower roller 55 of main rocker arm 52.

High lift cam 58 is a cam with a large valve lift amount, for slidably contacting cam follower portion 56 of subsidiary rocker arm 53.

Note, subsidiary rocker arm 53 is urged by a lost motion spring 59 to rotate upwards, so that a slidable contacting state of subsidiary rocker arm 53 with high lift cam 58 is kept even in a state subsidiary rocker arm 53 is detached from main rocker arm 52.

Further, as a coupling mechanism for selectively coupling main and subsidiary rocker arms 52 and 53, a coupling lever 60 is disposed below subsidiary rocker arm 53.

Coupling lever 60 is supported to be rotatable by a pin 60 disposed to main rocker arm 52, and an upper end portion of coupling lever 60 can be engaged with an engaging shoulder 62 on a lower face of subsidiary rocker arm 53.

Then, coupling lever 60 is always urged by a return spring (not shown in the figure) to an engagement release direction, and a hydraulic plunger 63 is arranged to face a lower end portion of coupling lever 60. If plunger 63 projects, coupling lever 60 is rotated to an engagement direction.

To a hydraulic cylinder 64 in which plunger 63 is slidably fitted, an oil pressure is supplied via an oil hole 65 within main rocker arm 52 and an oil pressure supply passage 66 within rocker shaft 51.

Accordingly, if the oil pressure is supplied to hydraulic cylinder 64 via oil pressure supply passage 66, coupling lever 66 is rotated to the engagement direction to be engaged with engaging shoulder 62 of subsidiary rocker arm 53.

Thus, when subsidiary rocker arm 53 is depressed downwards by high lift cam 58, main rocker arm 52 operates integrally with subsidiary rocker arm 53, so that exhaust valve 10b is opened/closed in accordance with a profile of high lift cam 58.

Further, if the oil pressure is released, coupling lever 60 is rotated by the return spring to a direction for releasing the engagement, and as a result, the upper end portion thereof is detached from engaging shoulder 62.

Thus, subsidiary rocker arm 53 is detached from main rocker arm 52, and exhaust valve 10b is opened/closed in accordance with a profile of low lift cam 57 via main rocker arm 52.

Figure 5:
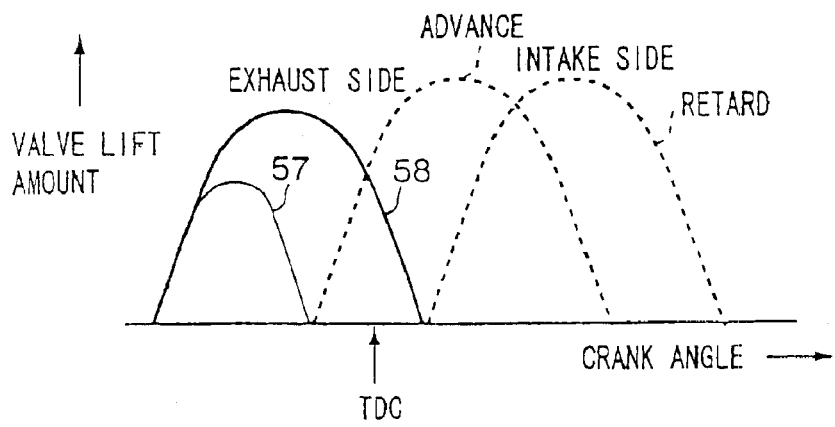
FIG. 5 is a graph showing a change in valve characteristics by the variable valve timing mechanism and the variable valve mechanism.

Here, open/close characteristics of exhaust valve 10b by low lift cam 57 and high lift cam 58 are set as shown in FIG. 5.

As shown in FIG. 5, each opening time of exhaust valve 10b by low lift cam 57 and high lift cam 58 is approximately the same. However, an operating angle on a low lift cam 57 side is small, so that exhaust valve 10b is closed at timing earlier than a closing time by high lift cam 58.

Note, profiles of cams for opening/closing exhaust valve 10a are set to be the same as the profile of high lift cam 58. Therefore, in a state where exhaust valve 10b is opened/closed by high lift cam 58, exhaust valves 10a and 10b are opened/closed in the same valve timing and by the same valve lift amount.

On the other hand, if valve timing of intake valves 9a and 9b is advanced by variable valve timing mechanism 13, each opening time of intake valves 9a and 9b substantially coincides with the closing time of exhaust valve 10b by low lift cam 57.

Further, if valve timing of intake valves 9a and 9b is retarded, each opening time of intake valves 9a and 9b is set to substantially coincide with the closing time of exhaust valve 10b by high lift cam 58.

Control unit 20 is equipped with a microcomputer including a CPU, a ROM, a RAM, an A/D converter, an input/output interface and so forth.

Control unit 20 controls throttle valve 4, fuel injection valve 5, ignition plug 6, variable valve timing mechanism 13 and variable valve mechanism 14 based on detection signals from various sensors.

The various sensors include a crank angle sensor 21 for detecting a crank angle of engine 1 and a cam sensor 22 for outputting a cylinder discrimination signal. A rotation speed Ne of engine 1 is computed based on a signal from crank angle sensor 21.

In addition, there is provided an air flow meter 23 for detecting an intake air flow quantity Qa, an acceleration sensor 24 for detecting an accelerator pedal depression amount APS (accelerator opening), a throttle sensor 25 for detecting an opening degree TVO of throttle valve 4, a water temperature sensor 26 for detecting a cooling water temperature Tw, an oxygen sensor 27 for detecting an oxygen concentration of the exhaust gas, and a vehicle speed sensor 28 for detecting a vehicle speed VSP.

Next, controls of variable valve timing mechanism 13 and variable valve mechanism 14 by control unit 20 will be described in detail in accordance with a flowchart in FIG. 6.

Figure 6:
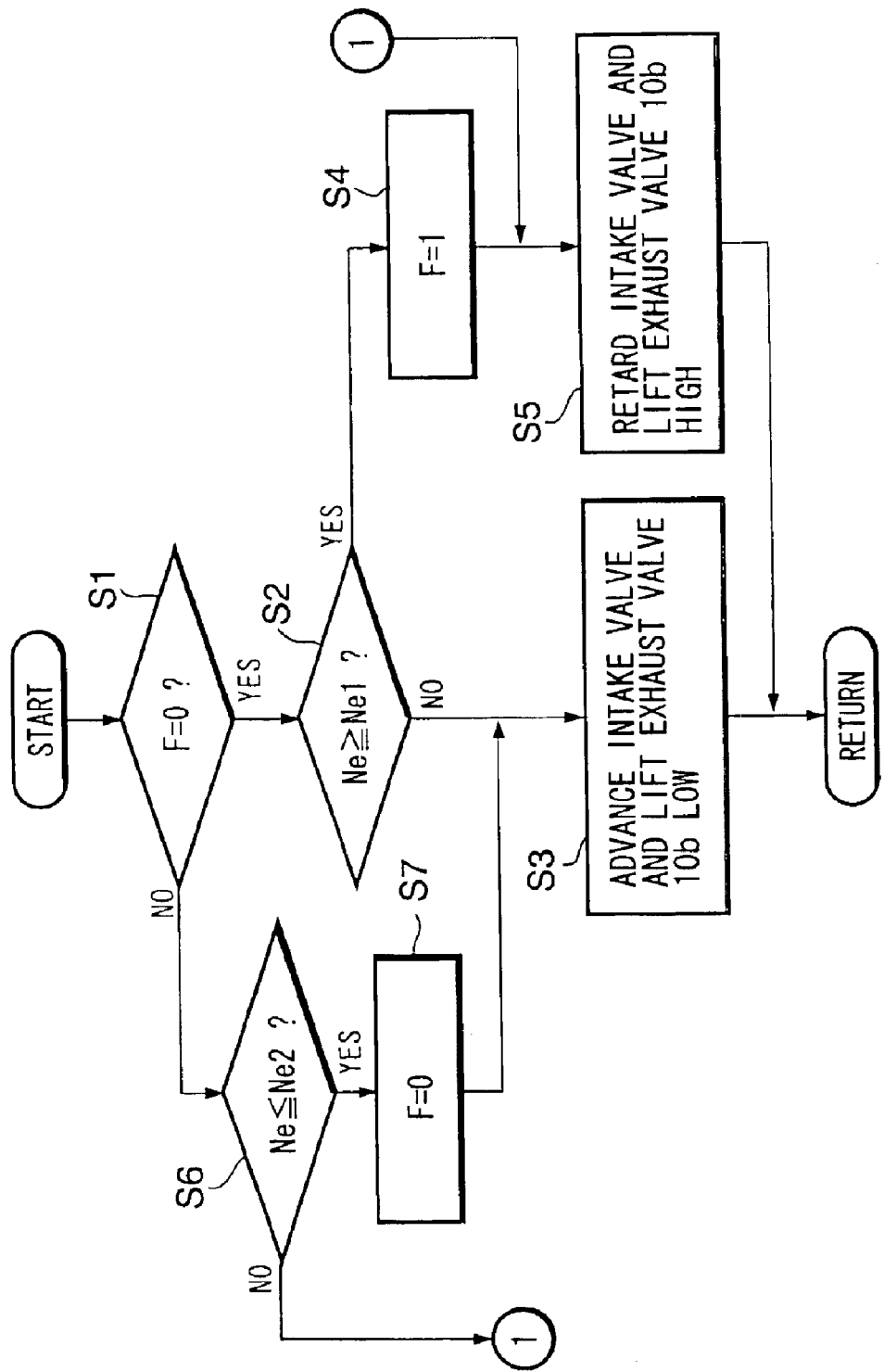
FIG. 6 is a flowchart showing a switching control of the valve characteristics.

In the flowchart in FIG. 6, in step S1, a judgment of a switching flag F is performed.

Note, an initial value of the switching flag F is 0.

Figure 7:
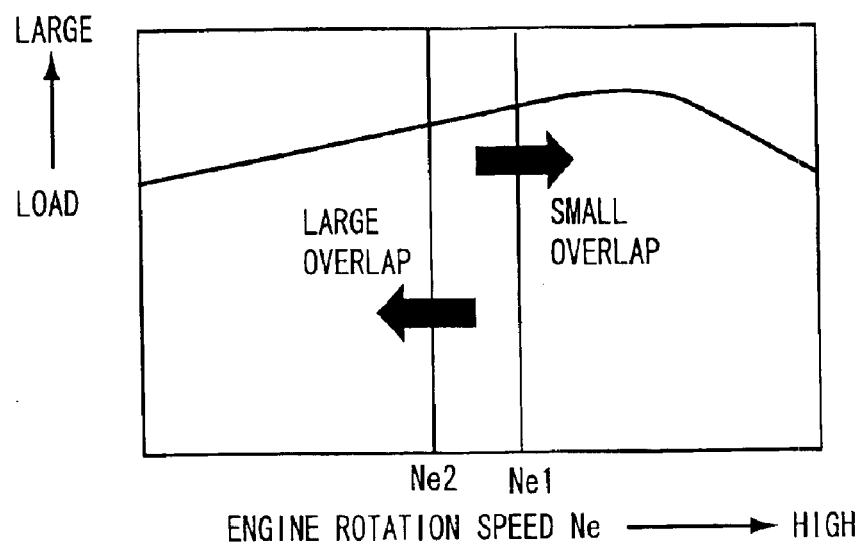
FIG. 7 is a graph showing a correlation between an engine rotation speed and switching timing of valve characteristics.

If flag F=0, control proceeds to step S2, where it is judged whether or not the engine rotation speed Ne is equal to or higher than a threshold Ne1 (refer to FIG. 7).

If flag F=0 and also Ne<Ne1, control proceeds to step S3.

In step S3, variable valve timing mechanism 13 is controlled so as to advance valve timing of intake valves 9a and 9b, and also variable valve mechanism 14 is controlled so as to use low lift cam 57 as a cam for driving exhaust valve 10b to open/close.

Figure 8:
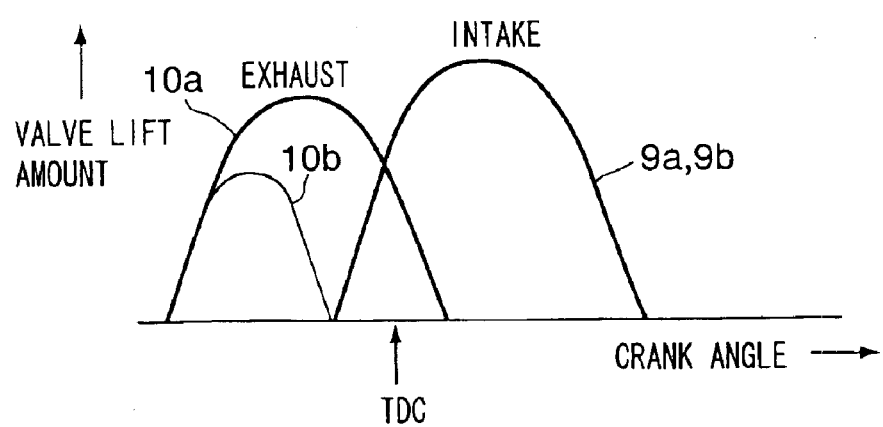
FIG. 8 is a graph showing valve lift characteristics in a low rotation region.

As a result of the above controls, in opening characteristics of intake/exhaust valves, as shown in FIG. 8, the closing time of exhaust valve 10b coincides with each opening time of intake valves 9a and 9b, and thereafter, exhaust valve 10a is rotated for a predetermined angle to be closed. A valve overlap period is set based on the opening states of intake valves 9a and 9b and the opening state of only exhaust valve 10a.

In the present embodiment, by advancing valve timing of intake valve 9a and 9b in a low rotation region, an overlap amount is increased to increase a cylinder residual gas amount, to improve fuel consumption and exhaust emission, and at the same time, only exhaust valve 10a is controlled to open during the valve overlap period.

Figure 9:
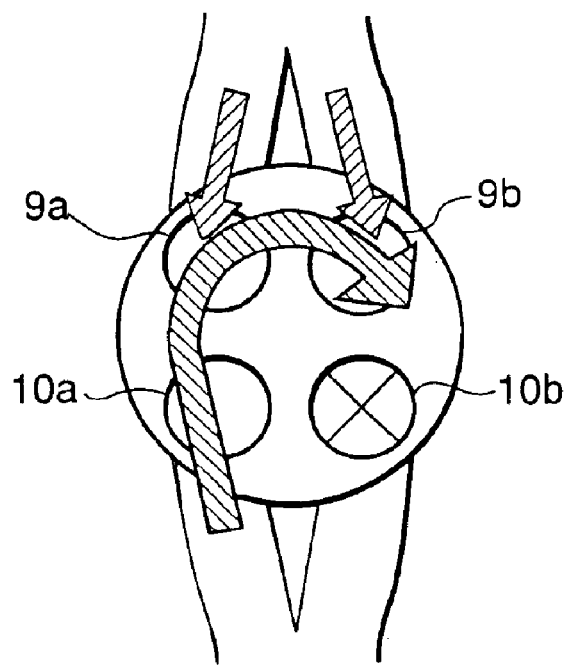
FIG. 9 is a diagram showing a state of gas flow during an overlap period, in the valve lift characteristics in FIG. 8.

Gas flow in the cylinder during the valve overlap period in the low rotation region is shown in FIG. 9.

Note, in FIG. 9, a mark X shown on exhaust valve 10b indicates that exhaust valve 10b is closed.

Namely, since only exhaust valve 10a is opened in the exhaust side while both of intake valves 9a and 9b are opened in the intake side, so that a passage through which the exhaust gas is to flow back is narrowed, the exhaust gas flows back via exhaust valve 10a at a speed higher than that of intake air.

Thus, the exhaust gas flow at the higher speed becomes main flow to form the clockwise gas flow in the cylinder.

Therefore, in comparison with the case where all of valves are opened during the valve overlap period so that the flow from the intake side and the flow from the exhaust side interfere with each other, the gas flow in the cylinder is enhanced.

As a result, it is possible to extend the overlap period to increase the cylinder residual gas amount, while ensuring the high combustibility, and to achieve the utmost improvement of fuel consumption and exhaust emission by increasing the cylinder residual gas amount.

Further, since low lift cam 57 is used for driving exhaust valve 10b to decrease a cam driving torque, it is possible to improve the fuel consumption and the power.

Moreover, since the cylinder residual gas amount can be increased, it is possible to achieve the rise of exhaust temperature at engine starting. Thus, it is possible to activate catalytic converter 8 promptly to decrease a discharge amount of unburned components.

On the other hand, if it is judged in step S2 that the engine rotation speed Ne is equal to or higher than the threshold Ne1, control proceeds to step S4, where 1 is set to flag F.

In the next step S5, variable valve timing mechanism 13 is controlled so as to retard valve timing of intake valves 9a and 9b, and also, high lift cam 58 is used as the cam for driving exhaust valve 10b to open/close.

Figure 10:
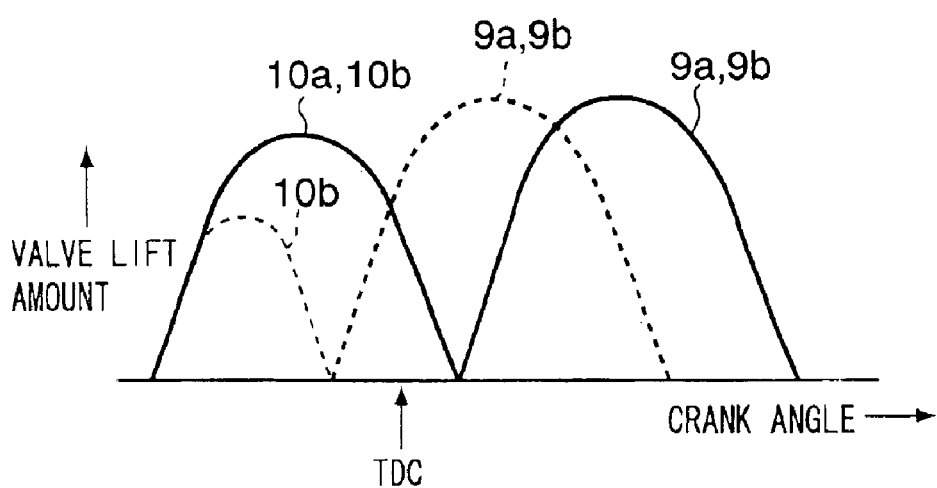
FIG. 10 is a graph showing valve characteristics in a high rotation region.

Consequently, exhaust valves 10a and 10b are both opened/closed in accordance with the profile of high lift cam 58, and also valve overlap becomes 0 (refer to FIG. 10).

If it is judged in step S1 that flag F is 1, control proceeds to step S6.

In step S6, it is judged whether or not the engine rotation speed Ne is equal to or less than a threshold Ne2(<Ne1: refer to FIG. 7).

Then, until the engine rotation speed Ne is lowered to the threshold Ne2 or less, flag F=1 is kept, and control proceeds to step S5.

Thereby, the state where valve timing of intake valves 9a and 9b is retarded, and also both of exhaust valves 10a and 10b are opened/closed in accordance with the profile of high lift cam 58, is maintained.

On the other hand, if the engine rotation speed Ne reaches the threshold Ne2 or less, control proceeds to step S7 where flag F is set to 0, and then control proceeds to step S3.

Figure 11:
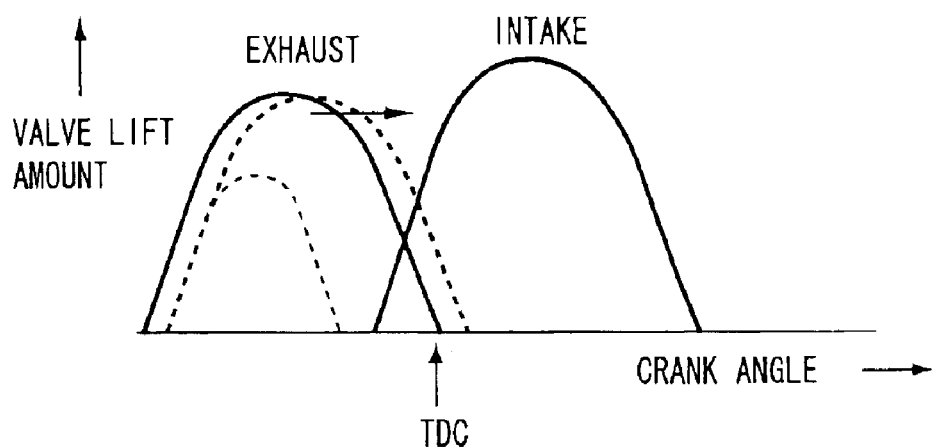
FIG. 11 is a graph of valve characteristics showing a constitution for increasing the overlap by retarding valve timing of the exhaust valve.

Note, instead of advancing valve timing of intake valves 9a and 9b, by providing variable valve timing mechanism 13 on exhaust side camshaft 12 as shown in FIG. 11, it is possible to retard valve timing of exhaust valves 10a and 10b in the low rotation region, to increase the valve overlap amount in the low rotation region.

Figure 12:
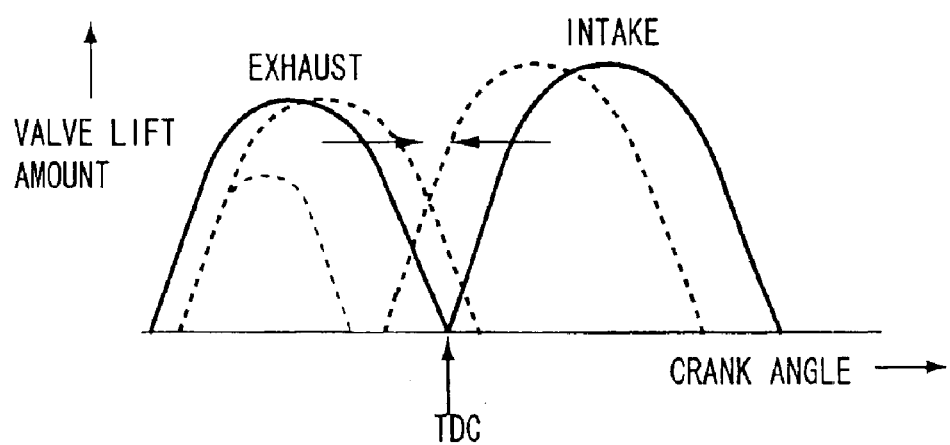
FIG. 12 is a graph of valve characteristics showing a constitution for increasing the overlap by retarding the valve timing of the exhaust valve and advancing valve timing of the intake valves.

Further, by providing variable valve timing mechanism 13 on each of intake side camshaft 11 and exhaust side camshaft 12 as shown in FIG. 12, it is possible to advance valve timing of intake valves 9a and 9b and to retard exhaust valves 10a and 10b, to increase the valve overlap amount in the low rotation region.

Figure 13:
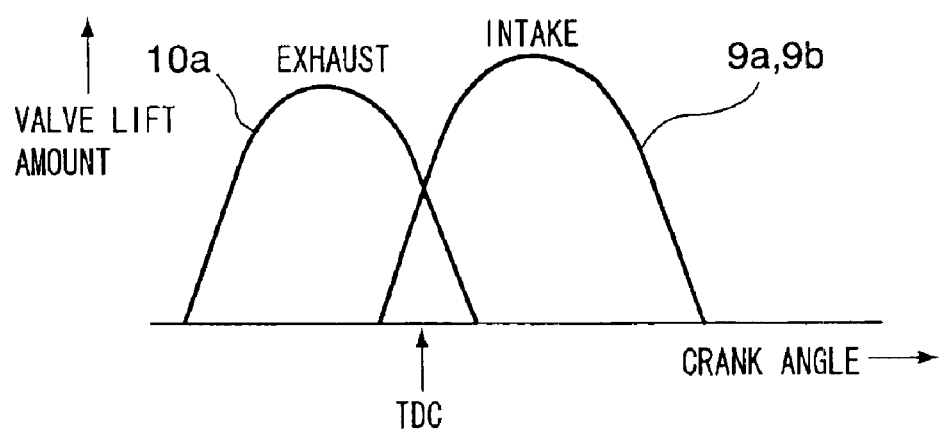
FIG. 13 is a graph showing valve characteristics in an embodiment for maintaining one of the exhaust valves closed in the low rotation region.

Furthermore, exhaust valve 10b may be kept closed in the low rotation region (refer to FIG. 13).

In this case, low lift cam 57 may be set to have a profile that does not drive exhaust valve 10b to open.

In the above embodiment, the constitution has been such that both intake valves 9a and 9b are opened during the valve overlap period. However, if only intake valve 9a that faces exhaust valve 10a with the cylinder center therebetween, is opened, the gas flow can be further enhanced.

Figure 14:
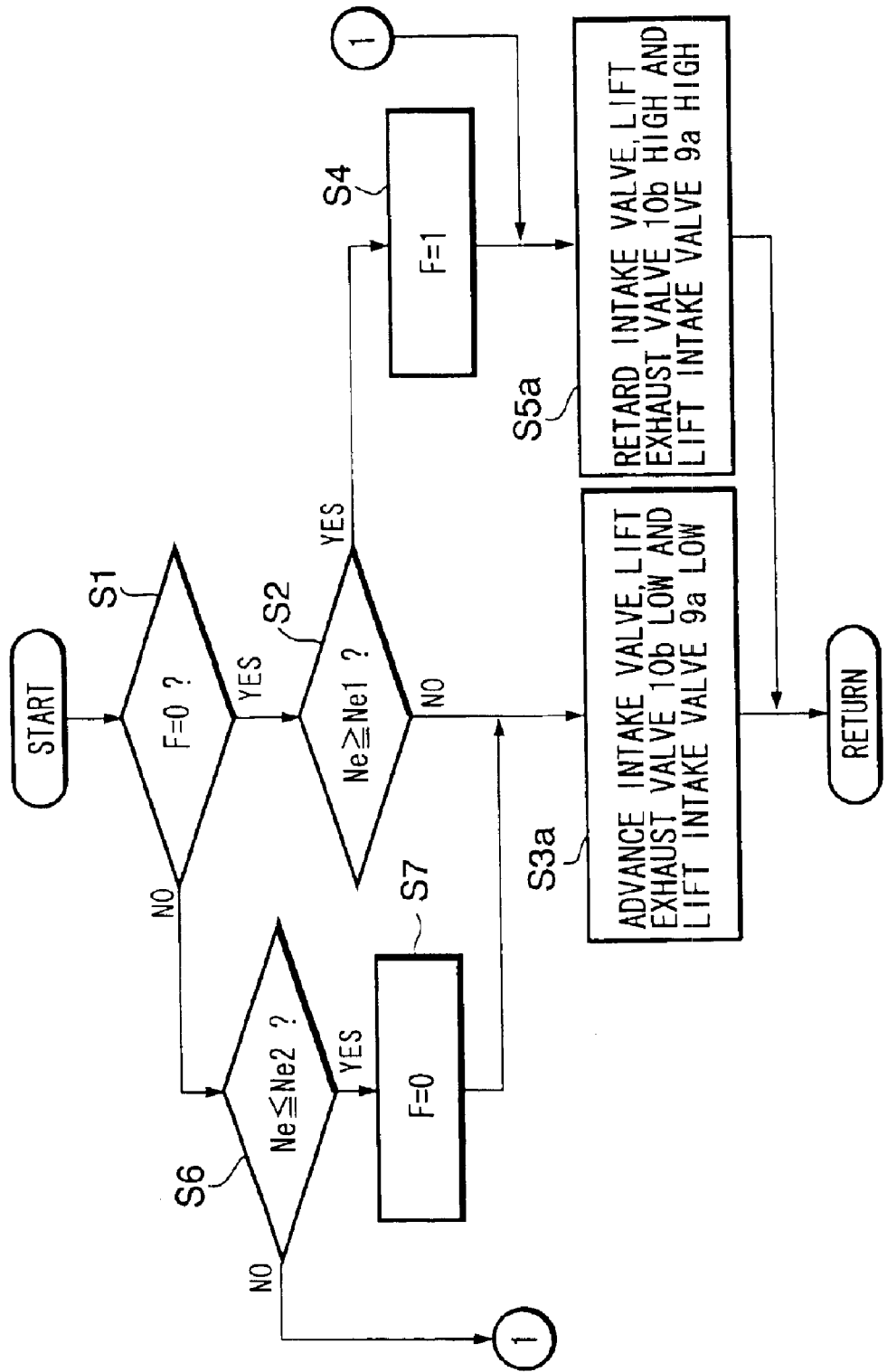
FIG. 14 is a flowchart showing a switching control of valve characteristics in an embodiment for switching a lift amount of intake valve together with a lift amount of exhaust valve.

In this case, there is provided variable valve mechanism 14 that switches between a low lift cam and a high lift cam that are to be used as a cam for driving intake cam 9a, and as shown in a flowchart of FIG. 14, the cam for driving intake cam 9a is switched.

Figure 15:
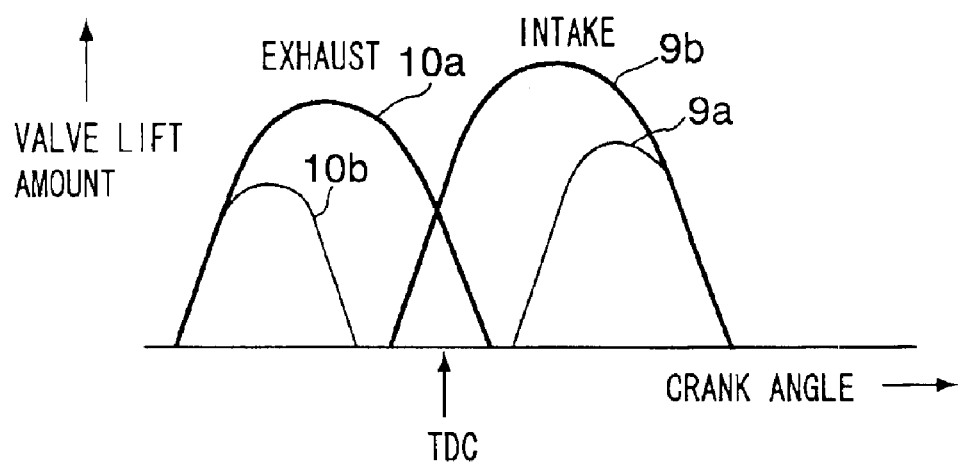
FIG. 15 is a graph showing valve characteristics in an embodiment for setting the overlap period in the low rotation region by one intake valve and one exhaust valve.

That is, in the high rotation region, both intake valves 9a and 9b are opened/closed by the high lift cam (step S5a), while in the low rotation region, intake valve 9a is opened/closed by the low lift cam (step S3a) and intake valve 9b is opened after the lapse of overlap period (refer to FIG. 15).

Figure 16:
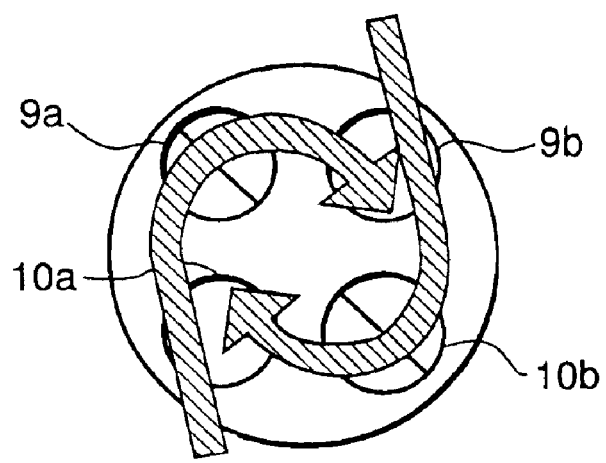
FIG. 16 is a diagram of a state showing gas flow during an overlap period, in the valve characteristics in FIG. 15.

According to the above constitution, as shown in FIG. 16, the exhaust gas flowing back into the cylinder from exhaust valve 10*a* flows towards the closed intake valve 9*a*, thereby forming the clockwise gas flow.

On the other hand, the fresh air introduced into the cylinder from intake valve 9*b* also flows towards the closed exhaust valve 10*b*, thereby forming the clockwise gas flow shown in FIG. 16. As a result, as shown in FIG. 16, the strong clockwise gas flow is formed.

Consequently, compared with the case where both intake valves 9*a* and 9*b* are opened during the valve overlap period, it is possible to form the strong gas flow, thereby enabling to further increase the cylinder residual gas amount.

Note, in the constitution in which only intake valve 9*a* is opened during the valve overlap period, exhaust valve 10*b* may be driven to open before the valve overlap period, or may be kept fully closed.

Moreover, in the constitution in which intake valves 9*a* and 9*b*, and exhaust valve 10*a* are opened during the valve overlap period, if a diameter (opening area) of an exhaust port to which exhaust valve 10*a* is disposed and/or a diameter of exhaust valve 10*a* are made to be smaller than those on the side of exhaust valve 10*b*, it is possible to increase a flow rate of the exhaust gas flowing back into the cylinder via exhaust valve 10*a*, thereby enabling to enhance the gas flow in the cylinder.

Figure 17:
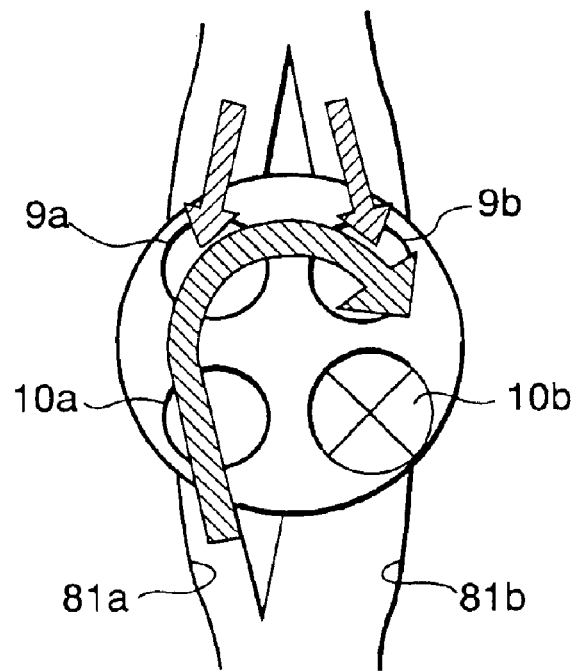
FIG. 17 is a diagram showing an embodiment in which port diameters of two exhaust valves are different from each other.

FIG. 17 shows an example in which a diameter of an exhaust port 81*a* to which exhaust valve 10*a* is disposed, is made to be smaller than a diameter of an exhaust port 81*b* to which exhaust valve 10*b* is disposed.

Figure 18:
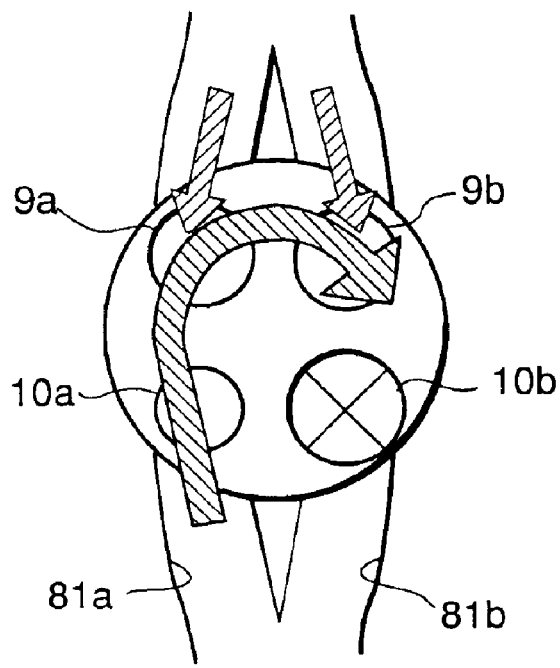
FIG. 18 is a diagram showing an embodiment in which valve diameters of two exhaust valves are different from each other.

FIG. 18 shows an example in which the diameter of exhaust valve 10*a* is made to be smaller than the diameter of exhaust valve 10*b*.

Figure 19:
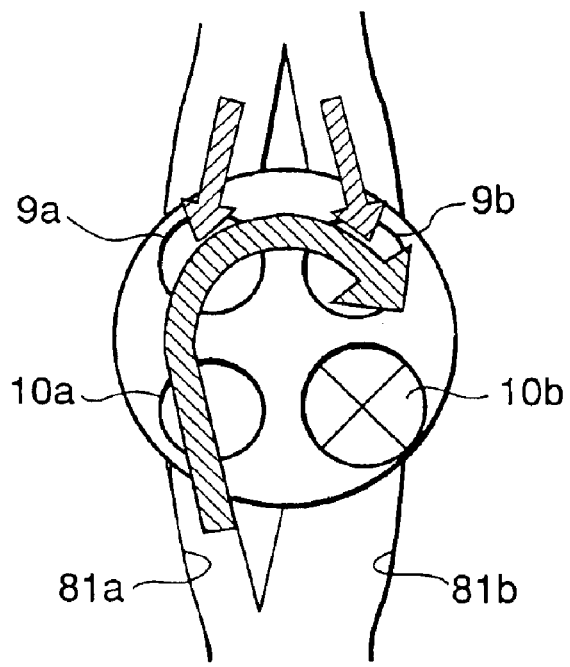
FIG. 19 is a diagram showing an embodiment in which port diameters and valve diameters of two exhaust valves are different from each other.

FIG. 19 shows an example in which the diameter of exhaust port 81*a* to which exhaust valve 10*a* is disposed, is made to be smaller than the diameter of exhaust port 81*b* to which exhaust valve 10*b* is disposed, and also, the diameter of exhaust valve 10*a* is made to be smaller than the diameter of exhaust valve 10*b*.

Furthermore, in the constitution in which intake valve 9*b* and exhaust valve 10*a* are opened during the valve overlap period, the diameter of exhaust port to which exhaust valve 10*a* is disposed and/or the diameter of exhaust valve 10*a* can be made to be smaller than those on the side of exhaust valve 10*b*, and also a diameter of an intake port to which intake valve 9*b* is disposed and/or a diameter of intake valve 9*b* can be made to be smaller than those on the side of intake valve 9*a*.

Figure 20:
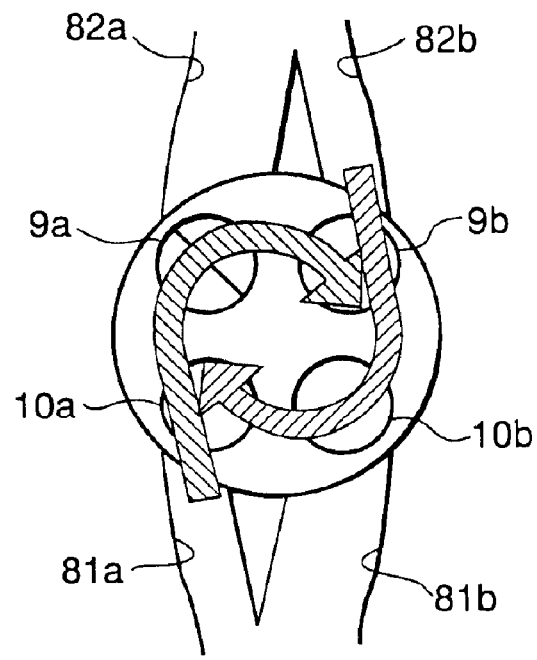
FIG. 20 is a diagram showing an embodiment in which port diameters of two exhaust valves are different from each other, and port diameters of two intake valves are different from each other.

FIG. 20 shows an example in which a diameter of an intake port 82*b* to which intake valve 9*b* is disposed, is made to be smaller than a diameter of an intake port 82*a* to which intake valve 9*a* is disposed, and also the diameter of exhaust port 81*a* to which exhaust valve 10*a* is disposed, is made to be smaller than the diameter of exhaust port 81*b* to which exhaust valve 10*b* is disposed.

Figure 21:
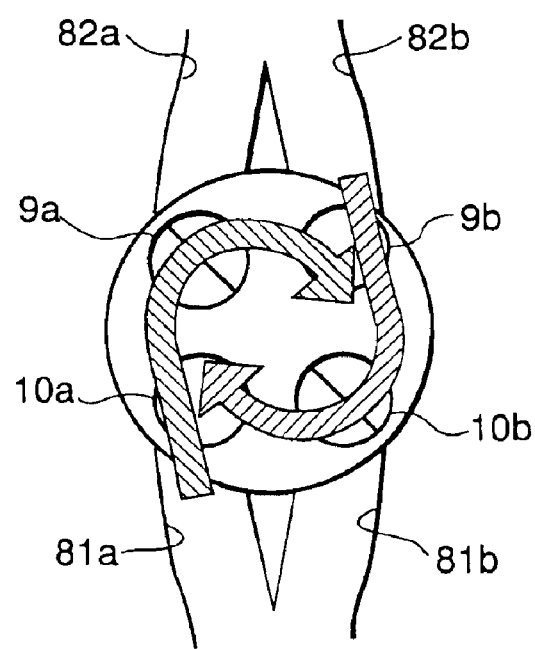
FIG. 21 is a diagram showing an embodiment in which valve diameters of two exhaust valves are different from each other and valve diameters of two intake valves are different from each other.

FIG. 21 shows an example in which the diameter of intake valve 9*b* is made to be smaller than the diameter of intake valve 9*a*, and also the diameter of exhaust valve 10*a* is made to be smaller than the diameter of exhaust valve 10*b*.

Figure 22:
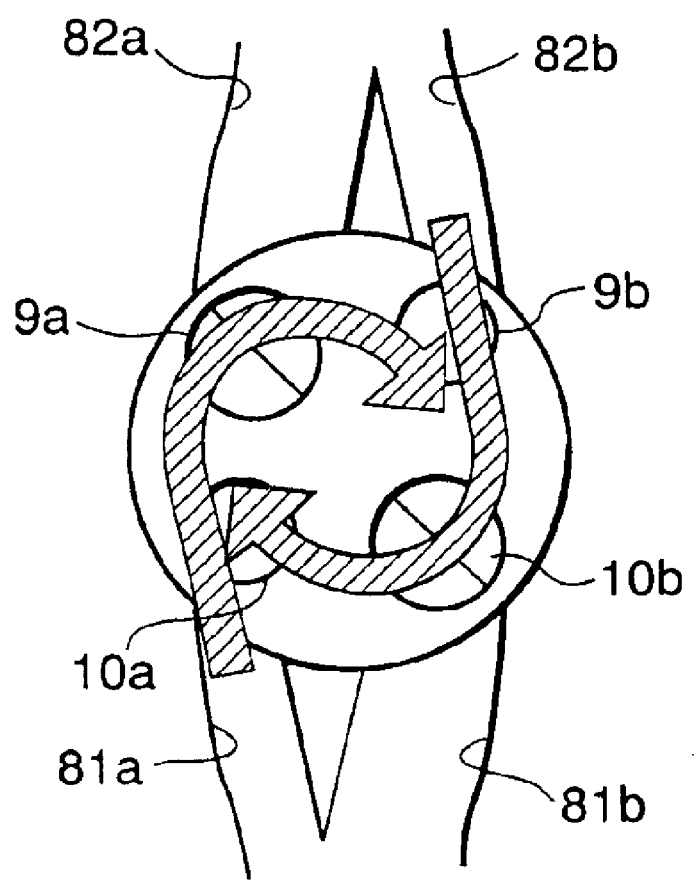
FIG. 22 is a diagram showing an embodiment in which port diameters and valve diameters of exhaust valves are different from each other, and port diameters and valve diameters of two intake valves are different from each other.

FIG. 22 shows an example in which the diameter of intake port 82*b* to which intake valve 9*b* is disposed, is made to be smaller than the diameter of intake port 82*a* to which intake valve 9*a* is disposed, and also the diameter of intake valve 9*b* is made to be smaller than the diameter of intake valve 9*a*, and further, the diameter of exhaust port 81*a* to which exhaust valve 10*a* is disposed, is made to be smaller than the diameter of exhaust port 81*b* to which exhaust valve 10*b* is disposed, and the diameter of exhaust valve 10*a* is made to be smaller than the diameter of exhaust valve 10*b*.

Further, if the constitution is such that an actuator (for example, electromagnet) is provided individually for each of intake and exhaust valves, to arbitrarily control opening/closing time of each of intake and exhaust valves, it is possible to set the valve overlap period within which only one of two exhaust valves is opened, without using variable valve timing mechanism 13 or variable valve mechanism 14.

Moreover, exhaust valve 10*b* needs not to be closed during all the valve overlap period, and the constitution may be such that exhaust valve 10*b* is opened until an initial time of the valve overlap period and thereafter is closed.

While only selected embodiments have been chosen to illustrate the present invention, it will be apparent to those skilled in the art from this disclosure that various change and modification can be made herein without departing from the scope of the invention as defined in the appended claims.

Furthermore, the foregoing description of the embodiments according to the present invention is provided for illustration only, and not for the purpose of limiting the invention as defined by the appended claims and their equivalents.

What is claimed is:

1. A variable valve control apparatus for an engine provided with two intake valves and two exhaust valves for each cylinder, comprising:

a variable valve mechanism that varies a lift characteristic of one of said two exhaust valves;

an operating condition detector that detects an operating condition of said engine; and a control unit that receives a detection signal from said operating condition detector to control said variable valve mechanism, wherein said control unit controls said variable valve mechanism to set a valve overlap period within which only one of said two exhaust valves is opened, by synchronizing opening timings of said two exhaust valves with each other, and differentiating closing timings of said two exhaust valves from each other, and wherein said valve overlap period within which only one of said two exhaust valves is opened, is set by opening said intake valves synchronously with a closing timing of the one exhaust valve, and thereafter closing the other exhaust valve, when the operating condition of the engine is a specific operating condition.

2. A variable valve control apparatus for an engine provided with two intake valves and two exhaust valves for each cylinder, comprising:

a variable valve mechanism that varies a lift characteristic of one of said two exhaust valves;

an intake side variable valve mechanism that varies a lift characteristic of one of said two intake valves;

an operating condition detector that detects an operating condition of said engine; and a control unit that receives a detection signal from said operating condition detector to control said variable valve mechanism and said intake side variable valve mechanism, wherein said control unit controls said variable valve mechanism to set a valve overlap period within which only one of said two exhaust valves is opened, by synchronizing opening timings of said two exhaust valves with each other, and differentiating closing timings of said two exhaust valves from each other, when the operating condition of the engine is a specific operating condition, and wherein during the valve overlap period within which only one of said two exhaust valves is opened, said control unit controls said intake side variable valve mechanism, to open only the intake valve which faces the exhaust valve to be opened with the cylinder center therebetween, of said two intake valves.

3. A variable valve control apparatus for an engine provided with two intake valves and two exhaust valves for each cylinder, comprising:

a variable valve mechanism that varies a lift characteristic of one of said two exhaust valves;

an operating condition detector that detects an operating condition of said engine; and a control unit that receives a detection signal from said operating condition detector to control said variable valve mechanism, wherein said control unit controls said variable valve mechanism to set a valve overlap period within which only one of said two exhaust valves is opened, by synchronizing opening timings of said two exhaust valves with each other, and differentiating closing timings of said two exhaust valves from each other, when the operating condition of the engine is a specific operating condition, and wherein an opening area of an exhaust port of the exhaust valve to be opened during the valve overlap period within which only one of said two exhaust valves is opened, is formed to be smaller than an opening area of an exhaust port of the exhaust valve to be closed.

4. A variable valve control apparatus for an engine provided with two intake valves and two exhaust valves for each cylinder, comprising:

a variable valve mechanism that varies a lift characteristic of one of said two exhaust valves;

an operating condition detector that detects an operating condition of said engine; and a control unit that receives a detection signal from said operating condition detector to control said variable valve mechanism, wherein said control unit controls said variable valve mechanism to set a valve overlap period within which only one of said two exhaust valves is opened, by synchronizing opening timings of said two exhaust valves with each other, and differentiating closing timings of said two exhaust valves from each other, when the operating condition of the engine is a specific operating condition, and wherein a valve diameter of the exhaust valve to be opened during the valve overlap period within which only one of said two exhaust valves is opened, is formed to be smaller than a valve diameter of the exhaust valve to be closed.

5. A variable valve control apparatus for an engine provided with two intake valves and two exhaust valves for each cylinder, comprising:

a variable valve mechanism that varies a lift characteristic of one of said two exhaust valves;

an operating condition detector that detects an engine rotation speed; and a control unit that receives a detection signal from said operating condition detector to control said variable valve mechanism, wherein said control unit controls said variable valve mechanism to set a valve overlap period within which only one of said two exhaust valves is opened, by synchronizing opening timings of said two exhaust valves with each other, and differentiating closing timings of said two exhaust valves from each other, when said engine rotation speed is lower than a threshold.

6. A variable valve control apparatus for an engine provided with two intake valves and two exhaust valves for each cylinder, comprising:

a variable valve mechanism that varies a lift characteristic of one of said two exhaust valves;

an operating condition detector that detects an engine rotation speed; and a control unit that receives a detection signal from said operating condition detector to control said variable valve mechanism, wherein said control unit controls said variable valve mechanism to set and extend a valve overlap period within which only one of said two exhaust valves is opened, by synchronizing opening timings of said two exhaust valves with each other, and differentiating closing timings of said two exhaust valves from each other, when said engine rotation speed is lower than a threshold.

7. A variable valve control apparatus for an engine provided with two intake valves and two exhaust valves for each cylinder, comprising:

a variable valve mechanism that varies a lift characteristic of one of said two exhaust valves, by switching, as a cam for opening/closing one of the two exhaust valves, between a cam with valve lift the same as that of the other exhaust valve and a cam with valve lift lower than that of the other exhaust valve;

an operating condition detector that detects an operating condition of said engine; and a control unit that receives a detection signal from said operating condition detector to control said variable valve mechanism, wherein said control unit controls said variable valve mechanism to set a valve overlap period within which only one of said two exhaust valves is opened, by synchronizing opening timings of said two exhaust valves with each other, and differentiating closing timings of said two exhaust valves from each other by driving one of the exhaust valves by means of the cam with said lower valve lift, when the operating condition of the engine is a specific operating condition.

8. A variable valve control apparatus for an engine provided with two intake valves and two exhaust valves for each cylinder, comprising:

a variable valve mechanism that varies a lift characteristic of one of said two exhaust valves, by switching, as a cam for opening/closing only one of the two exhaust valves, between a cam with valve lift the same as that of the other exhaust valve and a cam with valve lift lower than that of the other exhaust valve;

a variable valve timing mechanism that varies valve timing of said two intake valves;

an operating condition detector that detects an engine rotation speed; and a control unit that receives a detection signal from said operating condition detector to control said variable valve mechanism and said variable valve timing mechanism, wherein, when said engine rotation speed is lower than a threshold, said control unit controls said variable valve timing mechanism to advance the valve timing of said intake valves, and also controls said variable valve mechanism to set a valve overlap period within which only one of said two exhaust valves is opened, by synchronizing opening timings of said two exhaust valves with each other, and differentiating closing timings of said two exhaust valves from each other by driving one of the exhaust valves by means of the cam with lower valve lift.

9. A variable valve control method for an engine provided with two intake valves and two exhaust valves for each cylinder, the method comprising the steps of:
   detecting an operating condition of said engine; and
   setting, when the operating condition of the engine is a specific operating condition, a valve overlap period within which only one of said exhaust valves is opened by:
      synchronizing opening timings of said two exhaust valves with each other;
      opening intake valves synchronously with a closing timing of the one exhaust valve; and thereafter
      closing the other exhaust valve.

10. A variable valve control method for an engine provided with two intake valves and two exhaust valves for each cylinder, comprising the steps of:
    detecting an operating condition of said engine; and
    setting, when the operating condition of the engine is a specific operating condition, a valve overlap period within which only said first exhaust valve is opened by;
       synchronizing opening timings of said two exhaust valves with each other;
       differentiating closing timings of said two exhaust valves from each other; and
       opening only the intake valve which faces the exhaust valve to be opened with the cylinder center therebetween, of said two intake valves, during the valve overlap period within which only one of said two exhaust valves is opened.

11. A variable valve control method for an engine provided with two intake valves and two exhaust valves for each cylinder, wherein an opening area of a first exhaust port of in which the first exhaust valve of said two exhaust valves is disposed is formed to be smaller than an opening area of a second exhaust port in which the second exhaust valve is disposed, the method comprising the steps of:
    detecting an operating condition of said engine; and
    setting, when the operating condition of the engine is a specific operating condition, a
    valve overlap period within which only one of said exhaust valves is opened, by;
       synchronizing opening timings of said first exhaust valve and said second exhaust valve with each other; and
       differentiating closing timings of said two exhaust valves from each other.

12. A variable valve control method for an engine according to claim 11, wherein the step of differentiating closing timings of said two exhaust valves from each other comprises:
    delaying a closing timing of the first exhaust valve from that of said second exhaust valve.

13. A variable valve control method for an engine provided with two intake valves and two exhaust valves for each cylinder, wherein a valve diameter of the first exhaust valve of said two exhaust valves is formed to be smaller than a valve diameter of the second exhaust valve, the method comprising the steps of:
    detecting an operating condition of said engine; and
    setting, when the operating condition of the engine is a specific operating condition, a valve overlap period within which only said first exhaust valve is opened, by:
       synchronizing opening timings of said first exhaust valve and said second exhaust valve with each other; and
       differentiating closing timings of said two exhaust valves from each other.

14. A variable valve control method for an engine according to claim 13, wherein the step of differentiating closing timings of said two exhaust valves from each other comprises:
    delaying a closing timing of the first exhaust valve from that of said second exhaust valve.

15. A variable valve control method for an engine provided with two intake valves and two exhaust valves for each cylinder, the method comprising the steps of:
    detecting an engine rotation speed; and
    setting, when said engine rotation speed is lower than a threshold, a valve overlap period within which only one of said exhaust valves is opened, by:
       synchronizing operating timings of said two exhaust valves with each other; and
       differentiating closing timings of said two exhaust valves from each other.

16. A variable valve control method for an engine provided with two intake valves and two exhaust valves for each cylinder, the method comprising the steps of:
    detecting an engine rotation speed; and
    setting and extending, when said engine rotation speed is lower than a threshold, a valve overlap period within which only one of said exhaust valves is opened, by:
       synchronizing opening timings of said two exhaust valves with each other; and
       differentiating closing timings of said two exhaust valves from each other.

17. A variable valve control method for an engine provided with two intake valves and two exhaust valves for each cylinder, the method comprising the steps of:
    detecting an engine rotation speed; and
    setting, when said engine rotation speed is lower than a threshold, a valve overlap period within which only one of said exhaust valves is opened, by:
       synchronizing opening timings of said two exhaust valves with each other, by advancing valve timing of said intake valves; and
       differentiating closing timings of said two exhaust valves from each other, by driving one of the exhaust valves by means of a cam with valve lift lower than that of the other exhaust valve.

18. A variable valve control apparatus for an engine provided with two intake valves and two exhaust valves for each cylinder, comprising:
    an exhaust side variable valve mechanism that varies a lift characteristic of one of said two exhaust valves;
    an intake side variable valve mechanism that varies a lift characteristic of one of said two intake valves;
    an operating condition detector that detects an operating condition of said engine; and
    a control unit that receives a detection signal from said operating condition detector to control said exhaust side and intake side variable valve mechanisms,
    wherein said control unit controls said exhaust side variable valve mechanism to set a valve overlap period within which only one of said two exhaust valves is opened, when the operating condition of the engine is a specific operating condition; and
    wherein during the valve overlap period within which only one of said two exhaust valves is opened, said control unit controls said intake side variable valve mechanism, to open only the intake valve which faces the exhaust valve to be opened with the cylinder center therebetween, of said two intake valves.

19. A variable valve control apparatus for an engine according to claim 18, wherein said valve overlap period within which only one of said two exhaust valves is opened, is set by opening said intake valves synchronously with a closing time of the one exhaust valve, and thereafter closing the other exhaust valve.

20. A variable valve control apparatus for an engine according to claim 18, wherein an opening area of an exhaust port of the exhaust valve to be opened during the valve overlap period within which only one of said two exhaust valves is opened, is formed to be smaller than an opening area of an exhaust port of the exhaust valve to be closed.

21. A variable valve control apparatus for an engine according to claim 18, wherein a valve diameter of the exhaust valve to be opened during the valve overlap period within which only one of said two exhaust valves is opened, is formed to be smaller than a valve diameter of the exhaust valve to be closed.

22. A variable valve control apparatus for an engine according to claim 18,
wherein said operating condition detector detects an engine rotation speed, and
wherein said control unit sets the valve overlap period within which only one of said two exhaust valves is opened, when said engine rotation speed is lower than a threshold.

23. A variable valve control apparatus for an engine according to claim 18,
wherein said operating condition detector detects an engine rotation speed, and
wherein said control unit extends the valve overlap period and also sets the valve overlap period within which only one of said two exhaust valves is opened, when said engine rotation speed is lower than a threshold.

24. A variable valve control apparatus for an engine according to claim 18, wherein said variable valve mechanism switches, as a cam for opening/closing one of the exhaust valves, between a cam with valve lift the same as that of the other exhaust valve and a cam with valve lift lower than that of the other exhaust valve.

25. A variable valve control apparatus for an engine provided with two intake valves and two exhaust valves for each cylinder, comprising:
a variable valve mechanism that switches, as a cam for opening/closing one of said exhaust valves, between a cam set to have valve lift the same as that of the other exhaust valve and a cam set to have valve lift lower than that of the other exhaust valve;
a variable valve timing mechanism that varies valve timing of said two intake valves;
an operating condition detector that detects an operating condition of said engine including at least an engine rotation speed; and
a control unit that receives a detection signal from said operating condition detector to control said variable valve mechanism, and said variable valve timing mechanism,
wherein, when said engine rotation speed is lower than a threshold, said control unit controls said variable valve timing mechanism to advance the valve timing of said intake valves, and also controls said variable valve mechanism to drive one of the exhaust valves by means of the cam with lower valve lift, to thereby set a valve overlap period within which only one of said two exhaust valves is opened.

26. A variable valve control apparatus for an engine according to claim 25, wherein said control unit opens said intake valves synchronously with a closing time of the one exhaust valve, and thereafter closes the other exhaust valve, to set said valve overlap period within which only one of said two exhaust valves is opened.

27. A variable valve control apparatus for an engine according to claim 25, wherein an opening area of an exhaust port of the exhaust valve to be opened during the valve overlap period within which only one of said two exhaust valves is opened, is formed to be smaller than an opening area of an exhaust port of the exhaust valve to be closed.

28. A variable valve control apparatus for an engine according to claim 25, wherein a valve diameter of the exhaust valve to be opened during the valve overlap period within which only one of said two exhaust valves is opened, is formed to be smaller than a valve diameter of the exhaust valve to be closed.

29. A variable valve control apparatus for an engine provided with two intake valves and two exhaust valves for each cylinder, comprising:
exhaust side variable valve operating means for varying a lift characteristic of one of said two exhaust valves;
intake side variable valve operating means for varying a lift characteristic of one of said two intake valves;
operating condition detecting means for detecting an operating condition of said engine; and
control means for controlling said exhaust side variable valve operating means to set a valve overlap period within which only one of said exhaust valves is opened, when the operating condition of the engine detected by said operating condition detecting means is a specific operating condition, and controlling said intake side variable operating valve means during the valve overlap period in which only one of said exhaust valves is opened, to open only the intake valve which faces the exhaust valve to be opened with the cylinder center therebetween, of said two intake valves.

30. A variable valve control apparatus for an engine provided with two intake valves and two exhaust valves for each cylinder, comprising:
variable valve operating means for switching, as a cam for opening/closing one of said exhaust valves, between a cam set to have valve lift the same as that of the other exhaust valve or a cam set to have valve lift lower than that of the other exhaust valve;
variable valve timing means for varying valve timing of said two intake valves;
operating condition detecting means for detecting an operating condition of said engine including at least an engine rotation speed; and
control means for controlling said variable valve timing means to advance the valve timing of said intake valves, and also controlling said variable valve operating means to drive one of the exhaust valves by means of the cam with lower valve lift, to thereby set the valve overlap period within which only one of said two exhaust valves is opened, when said engine rotation speed is lower than a threshold.

31. A variable valve control method for an engine provided with two intake valves and two exhaust valves for each cylinder, and also an exhaust side variable valve mechanism that varies a lift characteristic of one of said two exhaust valves, and an intake side variable valve mechanism that varies a lift characteristic of one of said two intake valves, comprising the steps of:

detecting an operating condition of said engine; and setting a valve overlap period within which only one of said exhaust valves is opened, by controlling said exhaust side variable valve mechanism, when the operating condition of the engine is a specific operating condition, during the valve overlap period within which only one of said two exhaust valves is opened, controlling said intake side variable valve mechanism to open only the intake valve which faces the exhaust valve to be opened with the cylinder center therebetween, of said two intake valves.

32. A variable valve control method for an engine according to claim 31, wherein said step of setting the valve overlap period comprises the steps of:

opening intake valves synchronously with a closing time of the one exhaust valve; and thereafter closing the other exhaust valve.

33. A variable valve control method for an engine according to claim 31, wherein said step of setting the valve overlap period comprises the steps of:

detecting an engine rotation speed; and setting the valve overlap period within which only one of said two exhaust valves is closed, when said engine rotation speed is lower than a threshold.

34. A variable valve control method for an engine according to claim 31, wherein said step of setting the valve overlap period comprises the steps of:

detecting an engine rotation speed; and extending the valve overlap period and also setting the valve overlap period within which only one of said two exhaust valves is opened, when said engine rotation speed is lower than a threshold.

35. A variable valve control method for an engine provided with two intake valves and two exhaust valves for each cylinder, and also a variable valve mechanism that switches, as a cam for opening/closing one of the exhaust valves, between a cam set to have valve lift the same as that of one exhaust valve or a cam set to have valve lift lower than that of the other exhaust valve, and a variable valve timing mechanism that varies valve timing of said two intake valves, comprising the steps of:

detecting a rotation speed of said engine;

controlling said variable valve timing mechanism to advance the valve timing of said intake valves, when said engine rotation speed is lower than a threshold; and controlling said variable valve mechanism to drive one of the exhaust valves by means of the cam with lower valve lift, when said engine rotation speed is lower than said threshold.

36. A variable valve control method for an engine according to claim 35, wherein said step of controlling the variable valve mechanism comprises the steps of:

opening intake valves synchronously with a closing time of the one exhaust valve; and thereafter closing the other exhaust valve.

37. A variable valve control apparatus for an engine provided with two intake valves and two exhaust valves for each cylinder, comprising:

variable valve operating means for varying a lift characteristic of one of said two exhaust valves;

operating condition detecting means for detecting an operating condition of said engine;

control means that receives a detection signal from said operating condition detecting means to control said variable valve operating means, wherein said control means controls said variable valve operating means to set a valve overlap period within which only one of said two exhaust valves is opened, by synchronizing opening timings of said two exhaust valves with each other, and differentiating closing timings of said two exhaust valves from each other, and wherein said valve overlap period within which only one of said two exhaust valves is opened, is set by opening said intake valves synchronously with a closing timing of the one exhaust valve, and thereafter closing the other exhaust valve, when the operating condition of the engine is a specific operating condition.

38. A variable valve control apparatus for an engine provided with two intake valves and two exhaust valves for each cylinder, comprising:

variable valve operating means for varying a lift characteristic of one of said two exhaust valves;

intake side variable valve operating means for varying a lift characteristic of one of said two intake valves, operating condition detecting means for detecting an operating condition of said engine;

control means that receives a detection signal from said operating condition detecting means to control said variable valve operating means and said intake side variable valve operating means, wherein said control means controls said variable valve operating means to set a valve overlap period within which only one of said two exhaust valves is opened, by synchronizing opening timings of said two exhaust valves with each other, and differentiating closing timings of said two exhaust valves from each other, when the operating condition of the engine is a specific operating condition; and wherein during the valve overlap period within which only one of said two exhaust valves is opened, said control means controls said intake side variable valve operating means, to open only the intake valve which faces the exhaust valve to be opened with the cylinder center therebetween, of said two intake valves.

39. A variable valve control apparatus for an engine provided with two intake valves and two exhaust valves for each cylinder, comprising:

variable valve operating means for varying a lift characteristic of one of said two exhaust valves;

operating condition detecting means for detecting an operating condition of said engine;

control means that receives a detection signal from said operating condition detecting means to control said variable valve operating means, wherein said control means controls said variable valve operating means to set a valve overlap period within which only one of said two exhaust valves is opened, by synchronizing opening timings of said two exhaust valves with each other, and differentiating closing timings of said two exhaust valves from each other, when the operating condition of the engine is a specific operating condition; and wherein an opening area of an exhaust port of the exhaust valve to be opened during the valve overlap period within which only one of said two exhaust valves is opened, is formed to be smaller than an opening area of an exhaust port of the exhaust valve to be closed.

40. A variable valve control apparatus for an engine provided with two intake valves and two exhaust valves for each cylinder, comprising:

variable valve operating means for varying a lift characteristic of one of said two exhaust valves;

operating condition detecting means for detecting an operating condition of said engine; and control means that receives a detection signal from said operating condition detecting means to control said variable valve operating means, wherein said control means controls said variable valve operating means to set a valve overlap period within which only one of said two exhaust valves is opened, by synchronizing opening timings of said two exhaust valves with each other, and differentiating closing timings of said two exhaust valves from each other, when the operating condition of the engine is a specific operating condition; and wherein a valve diameter of the exhaust valve to be opened during the valve overlap period within which only one of said two exhaust valves is opened, is formed to be smaller than a valve diameter of the exhaust valve to be closed.

41. A variable valve control apparatus for an engine provided with two intake valves and two exhaust valves for each cylinder, comprising:

variable valve operating means for varying a lift characteristic of one of said two exhaust valves;

operating condition detecting means for detecting an engine rotation speed; and control means that receives a detection signal from said operating condition detecting means to control said variable valve operating means, wherein said control means controls said variable valve operating means to set a valve overlap period within which only one of said two exhaust valves is opened, by synchronizing opening timings of said two exhaust valves with each other, and differentiating closing timings of said two exhaust valves from each other, when said engine rotation speed is lower than a threshold.

42. A variable valve control apparatus for an engine provided with two intake valves and two exhaust valves for each cylinder, comprising:

variable valve operating means for varying a lift characteristic of one of said two exhaust valves;

operating condition detecting means for detecting an engine rotation speed; and control means that receives a detection signal from said operating condition detecting means to control said variable valve operating means, wherein said control means controls said variable valve operating means to set and extend a valve overlap period within which only one of said two exhaust valves is opened, by synchronizing opening timings of said two exhaust valves with each other, and differentiating closing timings of said two exhaust valves from each other, when said engine rotation speed is lower than a threshold.

43. A variable valve control apparatus for an engine provided with two intake valves and two exhaust valves for each cylinder, comprising:

variable valve operating means for varying a lift characteristic of one of said two exhaust valves, by switching, as a cam for opening/closing only one of said two exhaust valves, between a cam with valve lift the same as that of the other exhaust valve and a cam with valve lift lower than that of the other exhaust valve, operating condition detecting means for detecting an operating condition of said engine; and control means that receives a detection signal from said operating condition detecting means to control said variable valve operating means, wherein said control means controls said variable valve operating means to set a valve overlap period within which one of said two exhaust valves is opened, by synchronizing opening timings of said two exhaust valves with each other, and differentiating closing timings of said two exhaust valves from each other by driving one of the exhaust valves by means of the cam with lower value lift, when the operating condition of the engine is a specific operating condition.

44. A variable valve control apparatus for an engine provided with two intake valves and two exhaust valves for each cylinder, comprising:

variable valve operating means for varying a lift characteristic of one of said two exhaust valves, by switching, as a cam for opening/closing only one of said two exhaust valves, between a cam with valve lift the same as that of the other exhaust valve and a cam with valve lift lower than that of the other exhaust valve, variable valve timing means that varies valve timing of said two intake valves, operating condition detecting means for detecting an engine rotation speed; and a control means that receives a detection signal from said operating condition detecting means to control said variable valve operating means and said variable valve timing means, wherein, when said engine rotation speed is lower than a threshold, said control means controls said variable valve timing means to advance the valve timing of said intake valves, and also controls said variable valve operating means to set a valve overlap period within which only one of said two exhaust vales is opened, by synchronizing opening timings of said two exhaust valves with each other, and differentiating closing timings of said two exhaust valves from each other by driving one of the exhaust valves by means of the cam with lower value lift.

* * * * *